(No Model.)
G. WESTINGHOUSE, Jr.
SYSTEM OF GAS DISTRIBUTION.
No. 388,163. Patented Aug. 21, 1888.
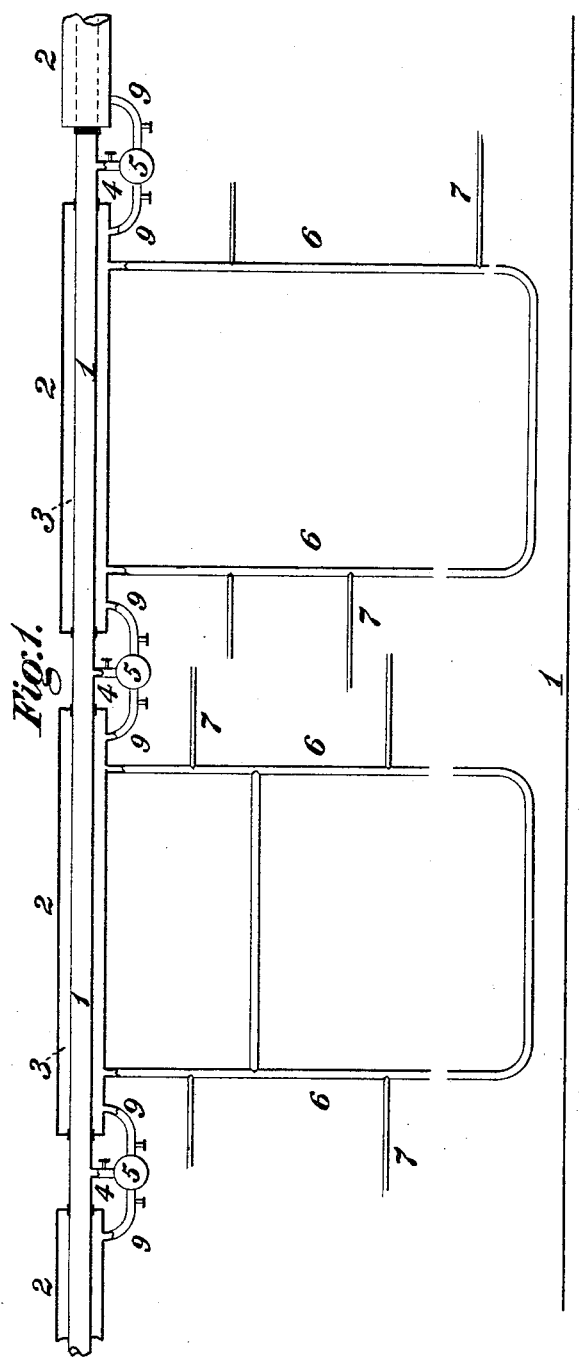
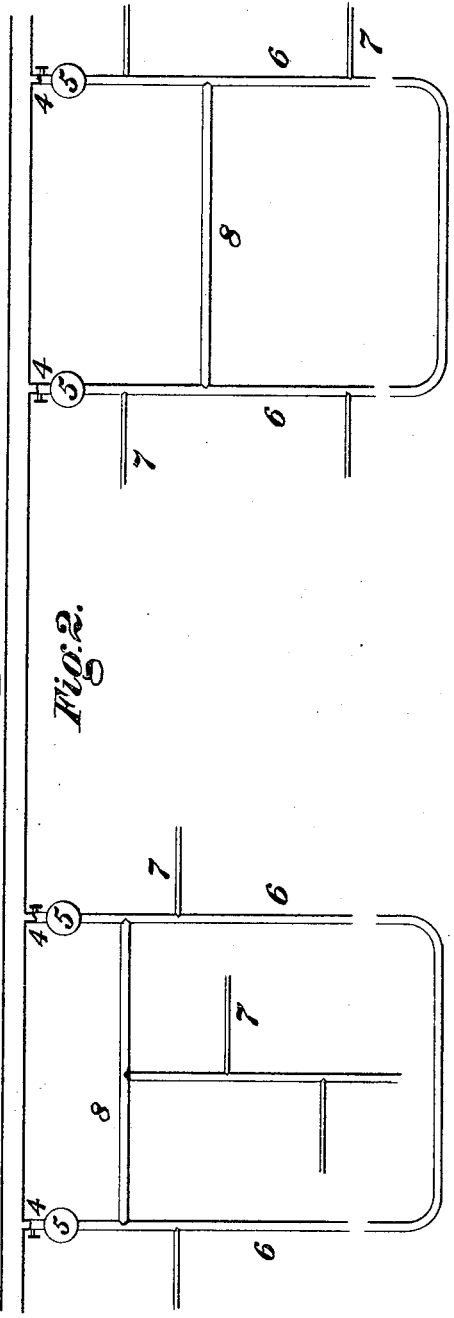

United States Patent Office.

GEORGE WESTINGHOUSE, JR., OF PITTSBURG, PENNSYLVANIA.

SYSTEM OF GAS-DISTRIBUTION.

SPECIFICATION forming part of Letters Patent No. 388,163, dated August 21, 1888.

Application filed August 15, 1884. Serial No. 140,637. (No model.)

*To all whom it may concern:*

Be it known that I, GEORGE WESTINGHOUSE, Jr., a citizen of the United States, residing at Pittsburg, in the county of Allegheny and State of Pennsylvania, have invented or discovered certain new and useful Improvements in System of Gas-Distribution, of which improvements the following is a specification.

In the accompanying drawings, which make part of this specification, Figures 1 and 2 are diagrammatic plan views illustrating plant adapted to the practice of my invention.

The object of my invention is to facilitate and economize the utilization of gas for heating and lighting purposes where a comparatively low and substantially constant pressure is requisite by the elimination of undue friction in the conducting-pipes and variations of pressure in the supply due thereto, in such manner as to attain a material reduction in the cost of plant and to render desirably practicable the employment of either natural or manufactured gas.

To this end my invention, generally stated, consists in the combination of a high-pressure main, a low-pressure main, two or more connections between the high-pressure and low-pressure mains, and means for regulating the pressure of the gas supplied through said connections. The improvements claimed are hereinafter fully set forth.

In the practice of my invention the gas which is furnished at high pressure from a well or generator is led therefrom, either directly or intermediately through a tank or gas-holder, into a high-pressure main, 1, through which it is conveyed to such points as may be desired for the location and connection of lines of low-pressure mains 6, from which it is to be delivered for consumption or storage, or both. The low-pressure mains 6 extend for such distance and in such direction as the conditions of distribution require, and each of said mains is connected at two or more points with the high-pressure main 1, so that it shall be supplied therefrom through separate and distinct avenues of communication, which may be as numerous as desired. Each of the connections 4, between the high and low pressure mains, is provided with a pressure-regulator, 5, adapted to reduce the pressure of the gas to that required in the low-pressure system, and said regulators may either be automatic in their operation, instances of which are given in applications for Letters Patent heretofore filed by me, or be regulated and adjusted by an operator.

The drawings illustrate a series of separate systems of low-pressure mains, 6, adapted for city distribution, each line of which is continuous and communicates at two points, to wit: Its ends with the high-pressure main and the service-pipes 7, through which the low-pressure gas is delivered, are led from the low-pressure mains at such points as may be required for the utilization of the gas. Continuity of communication in each low-pressure system is afforded by connecting the two longitudinal lines of mains of each by a transverse main at their terminals farthest from the high-pressure main, and they may likewise intercommunicate by supplemental transverse mains, 8, at intermediate points.

By the division of supply from the high-pressure main provided under my invention the friction due to the necessarily rapid flow through single openings to the several low-pressure systems is obviated, an equalization of pressure promoted throughout the several systems, and variations of pressure avoided.

Fig. 1 illustrates the application of my present invention in connection with a system in which the high-pressure main 1 is inclosed within a tight protecting-casing, 2, forming compartments 3, designed to be continuously charged with gas at low pressure, as in Letters Patent of the United States No. 301,191, granted and issued to me under date of July 1, 1884. The main 6 of each low-pressure system communicates at both ends with one of the compartments 3, and said compartment communicates by connections 9 with the high-pressure main at two points. The pressure-regulators 5 communicate through the connections 4 with the high-pressure main, and through the connections 9 with the compartments 3, valves being provided in said connections whereby the supply to the low-pressure systems may be cut off entirely or be afforded through different compartments, as may from time to time be desired or required.

It will be obvious that the construction, location, and number of the connections between the high-pressure main and the low pressure system may be varied in numerous particulars without departing from the spirit of my invention so long as interconnection or continuity of communication is afforded in each of the low-pressure systems, and supply thereto is afforded at two or more points.

I am aware that the distribution of fluids under pressure by the employment of separate lines of pipe in which higher and lower pressures, respectively, are maintained, as in Letters Patent No. 301,191, before referred to, was not new at the date of my present invention, and such, therefore, I distinctly disclaim. My present invention differs from that of said patent, as well as from all other prior systems as to which I have knowledge or information, in the essential particular of providing two separate and independent avenues of definitely-regulated communication between the high-pressure and the low-pressure mains, such novel feature attaining the substantial advantage of reducing the rapidity of flow and incident friction and more closely approximating equalization of pressure and avoiding variations thereof as compared with prior constructions.

I claim herein as my invention—

1. The combination of a high-pressure main, a low-pressure main communicating therewith at two or more points, two or more pressure-regulators, each governing an avenue of communication between the high and the low pressure main, and a low-pressure distributing-main connected at both of its ends or at two or more points to the low-pressure main and provided with a series of service-pipes, substantially as set forth.

2. The combination of a high-pressure main and a low-pressure distribution system composed of two or more interconnected lines of mains, said system communicating with the high-pressure main by two or more independent connections, each governed by a separate pressure-regulator, substantially as set forth.

In testimony whereof I have hereunto set my hand.

GEO. WESTINGHOUSE, JR.

Witnesses:
J. SNOWDEN BELL,
DARWIN S. WOLCOTT.